(12) United States Patent
Cole et al.

(10) Patent No.: US 8,068,039 B2
(45) Date of Patent: Nov. 29, 2011

(54) FLIGHT TRACK DISPLAY SYSTEM USING DATA FROM A PLURALITY OF SOURCES

(75) Inventors: James Cole, East Setauket, NY (US); Matthew Marcella, West Hempstead, NY (US); Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 0 days.

(21) Appl. No.: 11/226,785

(22) Filed: Sep. 14, 2005

(65) Prior Publication Data

US 2007/0069922 A1    Mar. 29, 2007

(51) Int. Cl.
*G01C 21/00* (2006.01)
(52) U.S. Cl. ........ 340/971; 340/961; 701/120; 701/121; 701/122; 701/301; 342/29; 342/30; 342/36
(58) Field of Classification Search .................. 340/971, 340/961; 701/120–122, 301; 342/160, 29, 342/30, 36
See application file for complete search history.

(56) References Cited

U.S. PATENT DOCUMENTS

| | | | | |
|---|---|---|---|---|
| 5,499,195 | A | * | 3/1996 | Castelaz .................. 342/159 |
| 6,081,764 | A | * | 6/2000 | Varon ..................... 701/120 |
| 2003/0009267 | A1 | * | 1/2003 | Dunsky et al. ............ 701/4 |

OTHER PUBLICATIONS

Webpages from the Internet Archives of Flightexplorer.com Jun. 2001 and Aug. 2003.*

* cited by examiner

*Primary Examiner* — George Bugg
*Assistant Examiner* — Ojiako Nwugo
(74) *Attorney, Agent, or Firm* — Fay Kaplun & Marcin, LLP

(57) ABSTRACT

Described is a system and method for displaying flight track data. The system and method include a data feed arrangement to receive target data points from a first data source and a second data source, a data receiving arrangement correlating target data points from the first data source with corresponding target data points received from the second data source, the correlation being based on location and time information in the target data points, a data analyzing arrangement to analyze the target data points and correlated data points and store each target data point and correlating data point in a target flight record, the target flight record corresponding to a target aircraft, a data generation arrangement to generate a flight track for the target aircraft using the data stored in the target flight record, wherein the flight track includes a first portion generated from the first data source and a second portion generated from the correlated target data points and a data distribution arrangement to organize the flight track into a displayable file and distribute the file to users of the system, wherein the displayable file is displayed on a graphical user interface including the flight track information.

17 Claims, 7 Drawing Sheets

FLIGHT TRACK DISPLAY SYSTEM USING DATA FROM A PLURALITY OF SOURCES

BACKGROUND INFORMATION

There may be multiple reasons for individuals to desire to know the flight paths of aircraft. For example, an individual may notice a plane that is flying a path that is not recognized by the individual (e.g., normally a plane on approach to the airport does not fly directly over the house, etc.). A particular plane may be flying low and causing a noise nuisance and/or the plane may be at or near the normal altitude, but is still causing an excessive amount of noise. A particular plane may make a maneuver that is questioned by the individual. A person may be looking to buy a house in a certain neighborhood and wants to research the flight paths over that neighborhood. These are only a few examples of the usefulness of flight path information and there are many other reasons why the flight paths of planes need to be known to private individuals. In addition, it is difficult to visually ascertain the true altitude and flight path of an aircraft.

However, it is very difficult for individuals to determine information associated with these flight paths even though most of the information associated with the flights is publically available information based on Federal Aviation Administration ("FAA") and airport records. For example, if an individual wanted to make a complaint about noise because of an airplane, the individual generally would like to be able to give some specifics about the airplane such as the general vicinity of the airplane, the altitude, the type of airplane, the airline, etc. But the average person who is not intimately familiar with airplanes and flight information cannot tell this information by looking up at the plane. The individual could go to the airport, the airport authority or the local FAA office and request the records, but this is difficult and time consuming. A simplified manner of tracking flights and flight paths that is available to the general public is needed to address issues such as described above.

SUMMARY OF THE INVENTION

A system for displaying flight track data, comprising a data feed arrangement to receive target data points from a first data source and a second data source; a data receiving arrangement correlating target data points from the first data source with corresponding target data points received from the second data source, the correlation being based on location and time information in the target data points; a data analyzing arrangement to analyze the target data points and correlated data points and store each target data point and correlating target data point in a target flight record, the target flight record corresponding to a target aircraft; a data generation arrangement to generate a flight track for the target aircraft using the data stored in the target flight record, wherein the flight track includes a first portion generated from the first data source and a second portion generated from the correlated data points; and a data distribution arrangement to organize the flight track into a displayable file and distribute the file to users of the system, wherein the displayable file is displayed on a graphical user interface including the flight track information.

In addition, a method, comprising the steps of collecting target data points from a first source and a second source corresponding to data for target aircraft; correlating data points from the first source with corresponding data points from the second source into correlated data points, the correlation being based on location and time information in the target data points; storing each of the target data points and correlated data points in a target flight record, wherein each target flight record corresponds to one target aircraft; creating a flight track from each of the target flight records, wherein a first portion of the flight track is generated with data from the first data source and a second portion of the flight track is generated with data from the first data source and the second data source; and creating a displayable file including the flight track and additional information, wherein the displayable file is displayable on a graphical user interface.

DETAILED DESCRIPTION

The present invention comprises a simplified flight track display system ("FTDS") for delivery via a communication network which may be, for example, the Internet, a corporate intranet, etc. The information that is provided to the users (e.g., via a graphical user interface) may include airplanes and other aircraft and their relevant tracks superimposed on a graphical map, such as those created by U.S. government Tiger mapping service or the Microsoft Corporation. For more information on the Tiger mapping service see the domain link http://tiger.census.gov/cgi-bin/mapbrowse-tbl. For more information on the maps created by the Microsoft Corporation see the domain link www.microsoft/mappoint-.net. The exemplary embodiment of the present invention is described as a web based system. However, those of skill in the art will understand that there may be any number of other manners of implementing the present invention in embodiments that are not web based.

Figure 1:
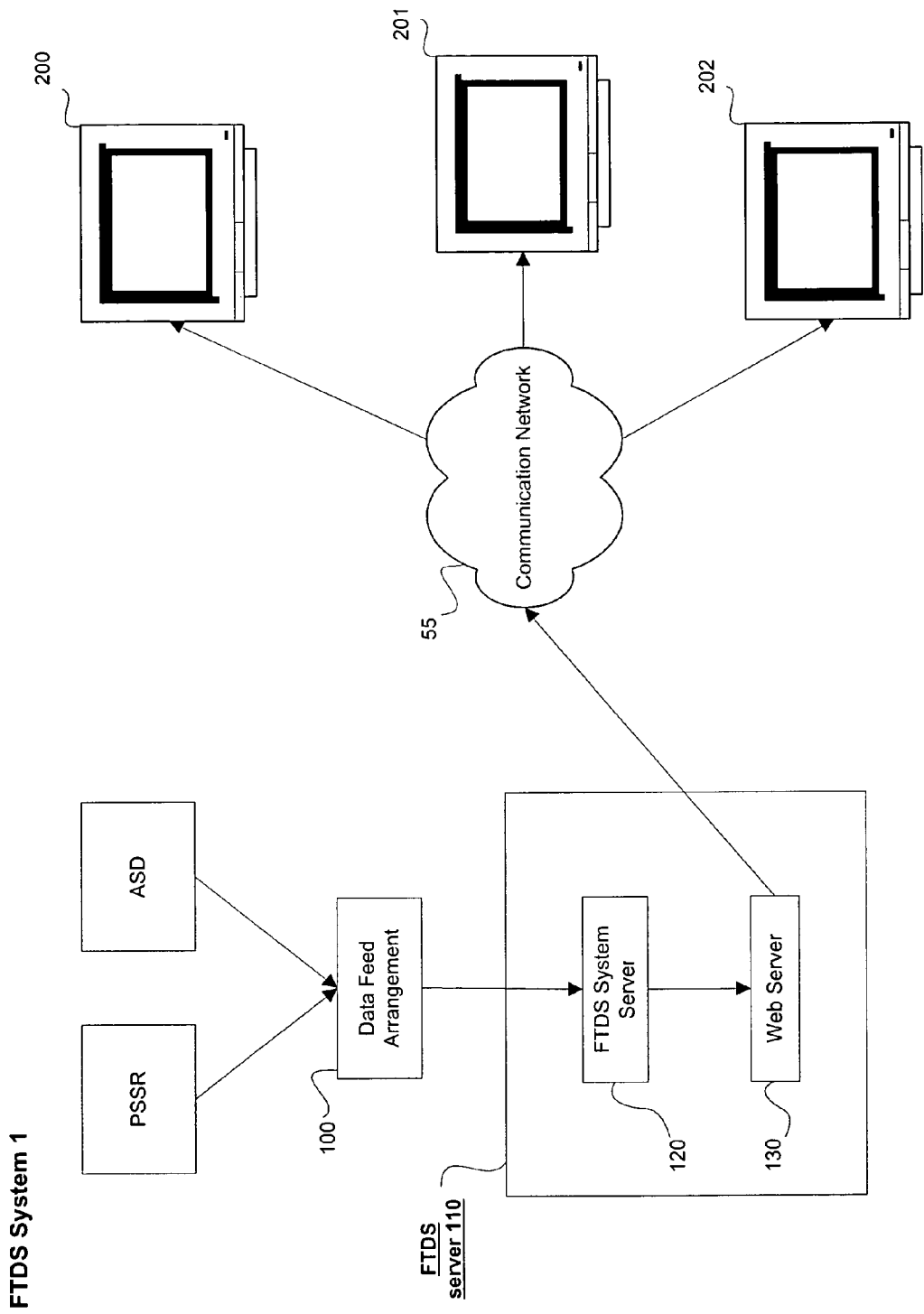
FIG. 1 shows an exemplary system according to the present invention.

FIG. 1 shows an exemplary FTDS system 1 according to the present invention. Data used to generate aircraft flight tracks may be obtained from a data feed arrangement 100. The data feed arrangement 100 may receive data on aircraft in flight from at least two data sources. The data sources may include one or more Passive Secondary Surveillance Radar ("PSSR") systems and an Aircraft Situation Display ("ASD") data source. A PSSR may be, for example, the PASSUR™

System sold by Megadata Corporation of Bohemia, N.Y. and the ASD data source is available for resale from the FAA.

With the exception of many small airports that serve general aviation, larger airports generally have a Secondary Surveillance Radar ("SSR") system. SSR includes a rotating radar that sends interrogation signals at a frequency of 1030 MHz to aircraft in the vicinity of the airport. Transponders aboard aircraft respond to the interrogations by transmitting a response signal back to the radar at a frequency of 1090 MHz. In addition to the SSR, PSSR may be sited near, but not on, the airport grounds. PSSR may include two antenna systems: a fixed, directional high gain 1030 MHz antenna aimed toward the SSR for receiving the interrogation signals; and a stationary array of directive antennas arranged in a circle to detect the 1090 MHz responses from the aircraft transponders. PSSR's may be placed at known distances and directions from a corresponding SSR.

Using the time relationships between received signals, i.e., the interrogations and responses, the known distances from the SSR, and the known direction from each PSSR to the SSR, the PSSR determines the location of aircraft relative to a reference location, e.g., the airport. Response signals from the aircraft received by PSSR include Mode A transponder beacon signals, Mode C transponder beacon signals and Mode S transponder beacon signals. The Mode A signal comprises a four (4) digit code which is the beacon code identification for the aircraft. The Mode C signal additionally includes altitude data for the aircraft. The Mode S signal is either a 56 bit surveillance format having a 32 bit data/command field and a 24 bit address/parity field or a 112-bit format allow for the transmission of additional data in a larger data/command field. PSSR receives the beacon code and altitude data from the received signals and calculates aircraft position (e.g., range, azimuth) and ground speed based on the timing of the receipt of the signals and the known radar locations. Thus, position information or target data points for each of the aircraft is derived based on the physical characteristics of the incoming signals, rather than based on position data contained in the signal itself.

When tracking a particular aircraft operating in the vicinity of an airport equipped with a PSSR, the data feed arrangement 100 may receive target data points from both PSSR and ASD. Aircraft operating beyond the range of any PSSR may be tracked with ASD alone. Therefore, depending on the location in which target data is sought, a stream of data from the data feed arrangement 100 may consist of target data points from PSSR, ASD, or both.

Target data points may include information about a flight being tracked. PSSR target data points may include a track identification, a time (e.g., UNIX time), a x-position, a y-position, altitude, x-velocity component, y-velocity component, z-velocity component, a speed, a airline, a aircraft type, etc. ASD target points may include similar information to PSSR, and may additionally include the aircraft's flight number and details of the aircraft's filed flight plan, including airport departed, destination airport, etc.

Throughout this description the convention will be maintained that each discrete set of data received for a particular flight by the FTDS system server 120 from the data feed arrangement 100 will be called a target data point. Examples of the information included in a target data point are described above. The target data points for an individual flight will be combined by the FTDS system server 120 into a target flight record and when this term is used it should be understood to mean all the target data points for each individual flight track. It should also be understood that the target flight record may include additional information over and above the combination of the target data points for an individual flight. For example, the target flight record may contain specific data used to display the track and indexing information to maintain the data from the target data points in the correct order. The term target is generally used to describe a flight (or aircraft) which is to be tracked. Throughout this description the airplanes are used as exemplary targets, but other aircraft may be used as well, e.g., helicopters. The term flight track is used to describe both the data associated with a particular flight and the graphical manifestation of that data as the icon superimposed on a map and a corresponding flight information data display.

The target data points which are inputted into the FTDS server 110 from the data feed arrangement 100 may be updated based on the type of system used for the data feed arrangement 100. For example, PSSR may provide real-time data updates at short time intervals (e.g., every 4.6 seconds). Whereas, ASD is generally updated at a slower interval of 1-4 minutes. Those of skill in the art will understand that a single sweep of the radars associated with the data feed arrangement may produce a plurality of target data points depending on the number of aircraft in the range of the tracking radar. As will be described in greater detail below, the FTDS server 110 will receive the target data points from the various sources and combine and organize the data into a coherent and easy to use flight tracking system. Some data feed arrangements 100 such as the PASSUR™ System provide the input data using a track smoothing process. However, other data feed arrangements 100 may not provide such smoothed data and it is not required to implement the present invention.

The data feed arrangement 100 is connected to the FTDS server 110, which may include, for example, the FTDS System server 120 software and web server 130 software. The connection between the data feed arrangement 100 and the FTDS server 110 may be, for example, a one way socket connection providing a serial stream of target report data, e.g., the target data points described above. The one way socket connection may be preferred to prevent users of the FTDS system 1 from corrupting the data contained in the data feed arrangement 100. However, there may be circumstances where a two way connection between the data feed arrangement 100 and the FTDS server 110 is desirable. The target data points may be transferred to the FTDS server 110 using any standard data format, for example, an ASCII format, a text format, etc.

The FTDS server 110 may be, for example, a standard PC based server system running an operating system such as LINUX. Those of skill in the art will understand that any computing platform may be used for the FTDS server 110. As the FTDS system server 120 software receives the target data points, it processes and analyzes the data to create flight tracks for the aircraft in the target area. If the Data Feed Arrangement supplies target data points from both PSSR and ASD sources, the target data points are compared to merge target data points from either source that correspond to the same aircraft. Each target data point is then filtered to determine whether the target data point is associated with a currently displayed flight track. If the target data point is associated with a previously displayed flight track it is added to the target flight record for that target. If the received target data point does not belong to a currently displayed flight track, the FTDS system server 120 software may create a new target flight record for a new flight track.

Figure 2:
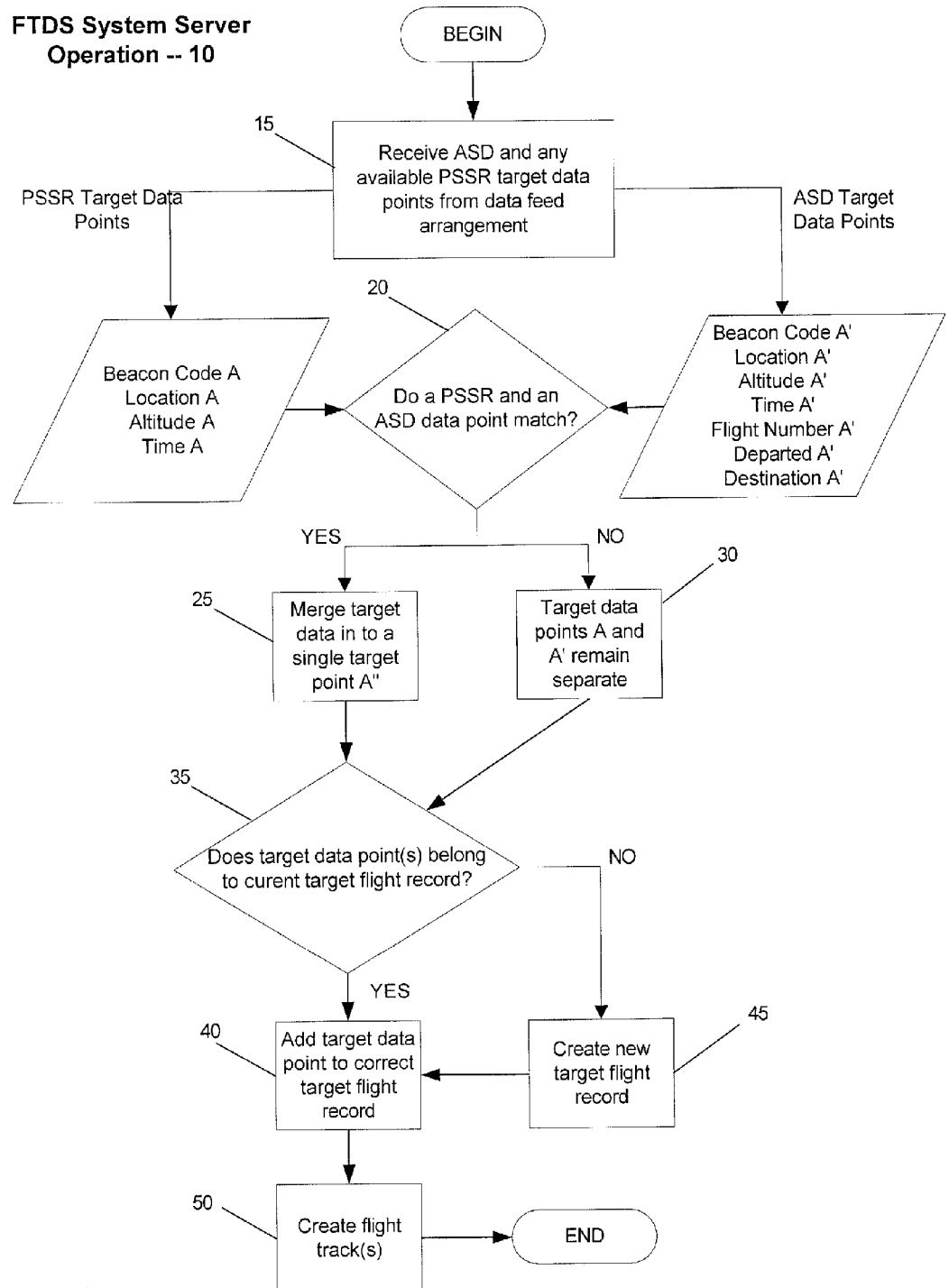
FIG. 2 shows an exemplary operation for the processing of the flight information received by the FTDS System server according to the present invention.

FIG. 2 shows an exemplary process 10 for the processing of the flight information received by the FTDS system server 120. In step 15 the FTDS system server 120 receives the PSSR and/or ASD target data points from the data feed arrangement 100 as described above. In step 20, the FTDS system server 120 determines whether any ASD target data points match or correspond to any received PSSR data points. The data included in the PSSR data points and the ASD data points are generally dissimilar information. However, there is some information which is common to both data feeds. Specifically, time and location information may be commonly contained in the information from both data feeds. Thus, the FTDS system server 120 may compare the time and location of a PSSR data point to the time and location of an ASD data point to determine if the two data points are for the same flight. The comparison may include an error factor to account for slight variations in time and/or location information from the two dat feeds. For example, the ASD data point may include location information within the error factor distance (e.g. 50 feet) from a PSSR data point and the FTDS system server 120 may consider these data points from the same flight.

Furthermore, the FTDS system server 120 may require multiple matches from corresponding data points before the combination of the data is performed. For example, the FTDS system server 120 may require that a threshold of data points (e.g. 3 data points) in a time threshold (e.g. 1 minute) match between the two data feeds before determining that the data points below to the same flight.

If the characteristics of a PSSR target data point match with the characteristics of an ASD target data point, the target data points are merged in step 25. The information and data provided by both sources are merged into a single target data point.

As described above, the ASD and PSSR may provide different information about a particular flight. Thus, the combination of this data provides a more comprehensive picture of the flight to the user of the system. If ASD target data points do not match any PSSR target data points, the target data points remain separate in step 30.

The system according to the present invention may track an aircraft using ASD target data points, PSSR target data points, or both ASD and PSSR data points. For example, an aircraft may travel out of range of the PSSR system (e.g. away from any major airport) for a period of time. Thus, the data feed arrangement 100 may receive only ASD target data points for the aircraft during that period of time. When the aircraft later flies within range of the PSSR system, the data feed arrangement 100 may receive both PSSR and ASD target data points corresponding to the aircraft. If a successful match of the target data points is made, the ASD and PSSR target data points will be merged. If the aircraft later flies out of range of a PSSR, the data feed arrangement 100 will resume receiving only ASD target data points and FTDS system 1 will continue to track the aircraft without interruption.

In step 35 shown in FIG. 2, the FTDS system server 120 determines whether each of the newly received target data points is associated with a current flight track, i.e., whether there is a target flight record with which the target data point is associated. If the target data point is not associated with a current target flight record, the process continues to step 45 where the FTDS system server 120 creates a new target flight record associated with this flight track. If the target data point is associated with a current target flight record (step 35) or the FTDS system server 120 created a new target flight record (step 45), the process continues to step 40 where the target data point is added to the appropriate target flight record. The process then continues to step 50 where the FTDS system server 120 processes the new data to update the flight track for the target flight. The processing of the data to create the flight track will be described in greater detail below and exemplary displays of flight tracks will be shown and described.

The data for the flight track is now processed and the flight track needs to be delivered to the users of the FTDS system 1. The FTDS server 110 may also contain web server 130 software to distribute the flight tracks to users of the FTDS system 1. In the exemplary embodiment of the FTDS system 1 shown in FIG. 1, the flight track generated by the FTDS system server 120 may be transmitted to a plurality of users (e.g., users 200-202) via a communications network 55 (e.g., the Internet). The web server 130 software may host a web page containing the necessary data and information to display the tracking information by local users. The users 200-202 may operate a web browser such as Microsoft's Internet Explorer, Netscape Navigator, or other third-party web browsing software which may access the web page hosted by web server 130 software. The web browser software operated by the users 200-202 will manage the flight track information that is transmitted to the client users 200-202 from the web server 130 software of the FTDS server 110. The data transferred from the FTDS server 110 may be, for example, HTML code or applets.

Thus, when a user (e.g., users 200-202) connects to the FTDS server 110 via communications network 55, the web server 130 software may send an FTDS applet to the user to enable the user to display and control the flight track data sent from the FTDS server 110 to the user. The applet code transferred to the user may be executed by the user's browser to display the tracking information. As the user remains connected to the FTDS server 110, the web server 130 software will continue to deliver data to update the flight tracks on the user's screen. The update may be performed automatically each time the FTDS server 110 receives updated information from the data feed arrangement 100. Updates from PSSR sources may occur approximately every 4.6 seconds, i.e., the time that the FTDS server 110 receives updates from a PSSR source plus the processing and data transmission times. Updates from ASD may occur approximately every 1-4 minutes. The data may be formatted by the FTDS server 110 and delivered to the web browser of the users 200-202 in any standard web browser readable format, for example, HTML format, Java, Java Script, etc.

Figure 3:
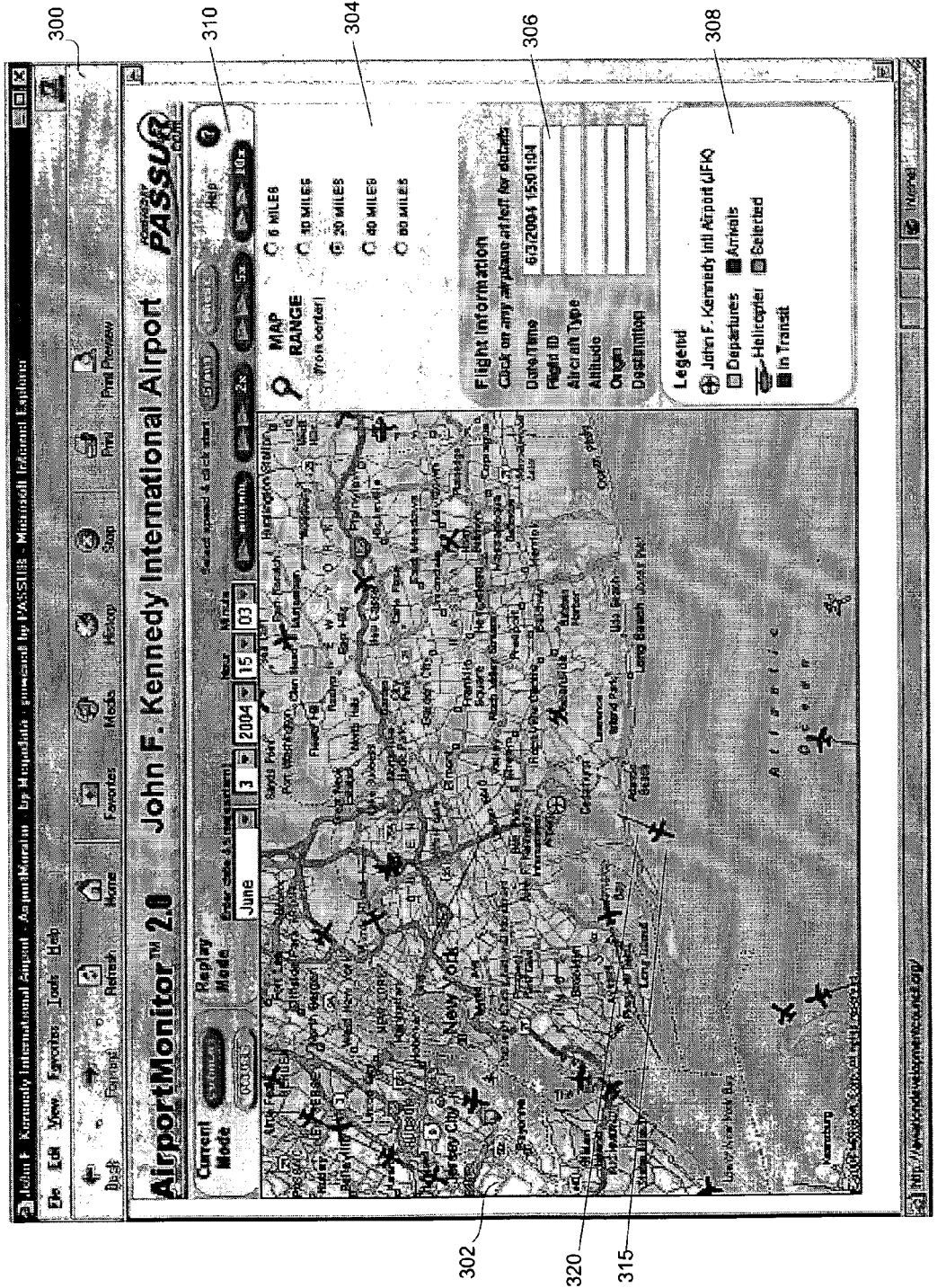
FIG. 3 shows an exemplary display screen that may be generated by the FTDS system server and transmitted to the users via the web server software according to the present invention.

FIG. 3 shows an exemplary display screen 300 that may be generated by the FTDS system server 120 and transmitted to the users 200-202 via the web server software 130. The exemplary display screen 300 shows a web page display that is formatted by the Internet Explorer web browser (e.g., the web browser on users' stations 200-202). The display screen 300 includes a map portion 302, a map range field 304, a flight information box 306 a legend box 308 and a replay field 310. Each of these areas will be described with reference to the display 300.

The display in FIG. 3 shows vicinity surrounding John F. Kennedy ("JFK") International Airport in New York. The displayed map 302 shows JFK International centered on the map 302 with a zoom set at twenty (20) miles from the center as shown by the map range field 304 at the top right of the screen 300. As can be seen from the map range field 304 there may be other preset zoom ranges, e.g., 5 miles, 10 miles, 40 miles, 80 miles. It may also be possible to have a variable zoom and pan features as are known in the art, i.e., the zoom may be adjusted to any level of detail desired by the user and/or the user may recenter the map on another feature rather than the airport itself.

This example display screen 300 is a near real time display as shown in the flight information box 306, the display is current as of the date and time of Jun. 3, 2004 at 15:01:04.

This display is termed a near real time display because, while it is possible to create a real time display according to the present invention, this embodiment utilizes a ten (10) minute delay for security purposes. Thus, a user would see the display screen 300 at the real time of Jun. 3, 2004 at 15:11:04 (i.e., ten (10) minutes after the time shown in the flight information box 306). The other information contained in the flight information box 306 will be described in greater detail below.

Referring to the map portion 302, there are numerous airplane icons shown, for example airplane 315. These airplane icons represent the current location (as of the date/time shown in the flight information box 306) of the aircraft that are currently being tracked within the confines of the map 302 area. The display 300 for the present invention may have the capability to display a plurality of aircraft tracks overlaid on the background map 302. There may be more aircraft currently being tracked by the exemplary FTDS system 1, but these aircraft are not located within the zoom area of the map 302 currently being displayed, i.e., these other aircraft are outside the 20 mile zoom area of map 302.

The aircraft icons may be displayed with a "tail" showing its most recent flight path. For example, an aircraft icon 315 is shown on the display 300 having a tail 320. This display may show the entire path of the aircraft when it is in the target area. Thus, the aircraft icon 315 and the tail 320 represent the flight track of the target aircraft. The FTDS system server 120 software generates this flight track for aircraft located in the target area using the data in the target flight record for the target aircraft.

As described above, the FTDS system server 120 receives target data points for the target aircraft from the data feed arrangement 100. When tracking aircraft within the vicinity of an airport, for example the location shown in FIG. 3, data may generally be received from one or more PSSR sources and an ASD source. When tracking aircraft outside the vicinity of any airports equipped with a PSSR, ASD data alone may be used. The FTDS system server 120 merges corresponding PSSR and ASD target data points and combines received data points into a target flight record as described above. The FTDS system server 120 may then use this data to generate the aircraft icon 315 and the tail 320 in the proper location on the map 302.

As described above, the target data points are received from data feed arrangement at some time interval (e.g., every 4.6 seconds for PSSR and 1-4 minutes for ASD). An aircraft may be traveling at hundreds of miles per hour, thus the location of the aircraft may change significantly within this time interval. The FTDS system server 120 may have to interpolate the path of the aircraft during this missing time (i.e., the FTDS system server 120 has the location at time 1 and at some later time 2, but needs to interpolate the locations between these two times). Thus, when the aircraft is flying a straight line or a making a turn, smoothing techniques based on the previous locations are used to create smooth flight tracks. Also, as described above a data feed arrangement 100, such as the PASSUR™ System, may input the target data points that have already been smoothed by a smoothing algorithm.

The legend box 308 of the display 300 shows a legend which may be used to aid users in understanding the display. The legends may be color codes which aid in quickly identifying the nature of the display. The specific color codes are not shown in the black and white drawing of FIG. 3, but exemplary color codes will be described. The first color code may be a code to easily identify the location of the airport (e.g., the JFK International location is shown in gray on the map 302). The second color code identifies those flights which departed from JFK International (e.g., all green aircraft icons took off from JFK). The third color code identifies those flights which are to arrive at JFK International (e.g., all blue aircraft icons are scheduled to land at JFK). The fourth color identifies those flights which are in transit (e.g., all black aircraft icons are traveling through the target area, but did not take off and are not scheduled to land at JFK). The fifth color icon is for those aircraft that have been selected by the user (e.g., the red aircraft icon has been currently selected by the user). The purpose and process of selecting an aircraft will be described in greater detail below. Another example of a color code may be a color code for a plane that is to land at a nearby airport.

These color codes as described for the legend box 308 will aid the user to quickly and easily identify information about a particular flight track. The information used to provide the color coding for the aircraft is provided to the FTDS system server 120 by the data feed arrangement 100. For example, the target data point for each target aircraft may include the origin and destination of the aircraft. This data may be used by the FTDS system server 120 to properly color code the corresponding icon. Those of skill in the art will understand that the origin and destination information may be transmitted with each target data point for the target aircraft or with less than each target data point for the target aircraft. Once the origin and destination are associated with a particular flight track in the target flight record by the FTDS system server 120 this information may not be needed for each target data point because the origin and destination will not change over time as parameters such as the aircraft's location.

Figure 4:
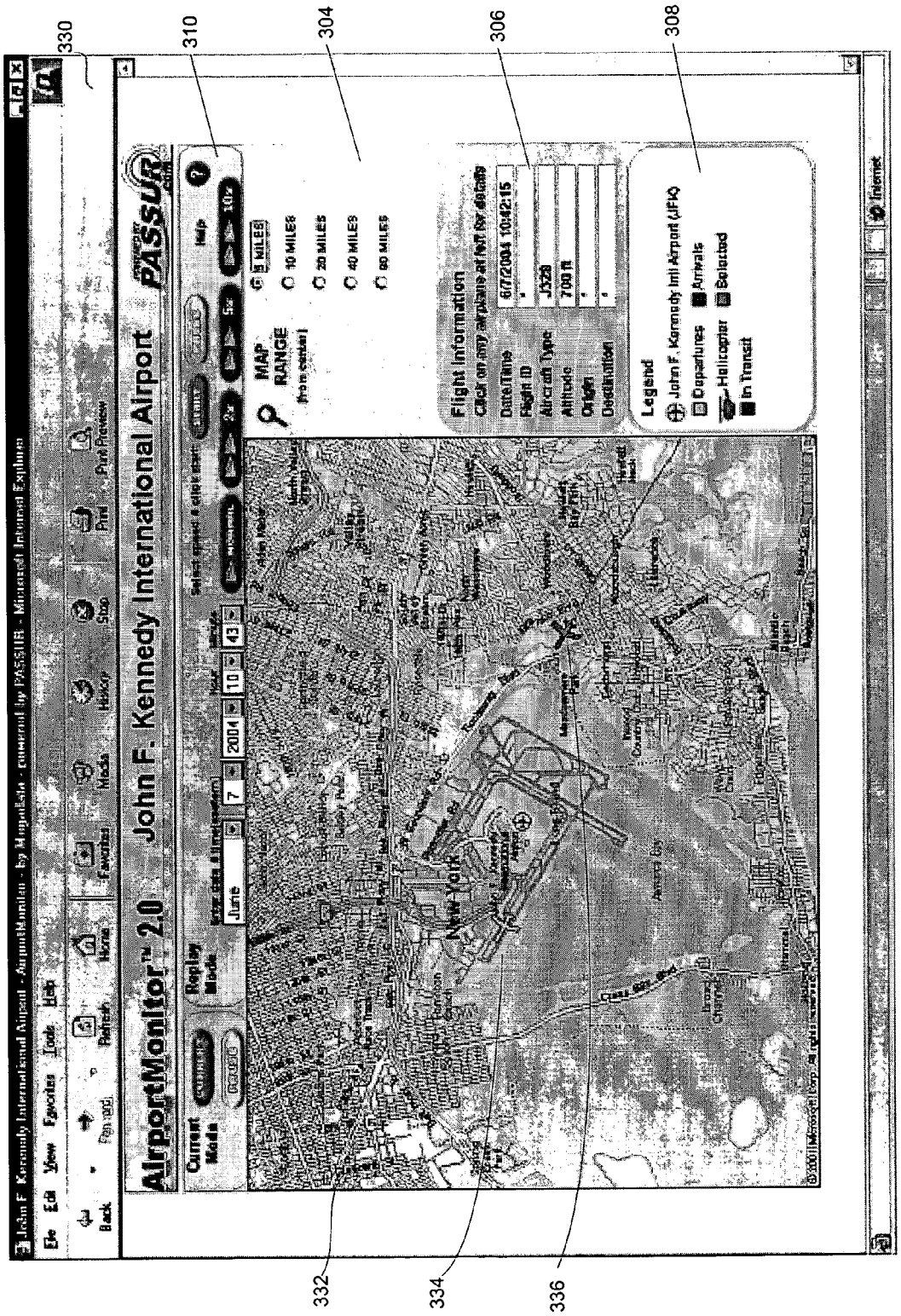
FIG. 4 shows an exemplary display screen that may be generated by the FTDS system server and transmitted to the users via the web server software according to the present invention.

FIG. 4 shows an exemplary display of JFK International at a zoom level of 5 miles, as indicated in the map range field 304. An aircraft 334 is shown departing JFK International. The color coding of the aircraft icon 334, though not visible in black and white, corresponds to the color of departing aircraft depicted in the legend box 308. This flight track provides an example of a new target flight record being created by the FTDS system server 120. For example, at some time shortly before the current time of 10:42:15 shown in the flight information box 306, the aircraft 334 departed from JFK International. The data feed arrangement 100 sent a target data point for that aircraft to the FTDS system server 120 which attempted to place the data from the target data point into a target flight record. However, the FTDS system server 120 determined that this target data point was not associated with any currently tracked aircraft and therefore this was a new aircraft for which a new flight track is to be created. Therefore, the FTDS system server 120 created a new target flight record and saved the target data points for this aircraft in the new target flight record. The FTDS system server 120 then used the data in the new target flight record to create the flight track 334 displayed on the display 330.

As shown at the top of the flight information box 306, the display 330 allows for a user to "Click on any airplane at left for details." Thus, a user displaying the display 330 may, for example, select a particular flight track by placing the mouse icon on the aircraft icon and clicking. The user may receive a positive feedback from the display in the form of the aircraft icon changing from its current color coding to a color coding indicating that the flight track was selected. The color coding indicating that an aircraft was selected may be displayed in legend box 308. Once the individual flight track has been selected, additional information for that flight may be displayed in the flight information box 306. For example, the Aircraft Type ("J328") and the altitude ("700 ft") are shown in the flight information box 306 in FIG. 4. This additional information is specific for an individual flight track as displayed on the map 332.

To give a specific example of a flight track being selected, it may be considered that on the display 330, the user placed the mouse icon over the aircraft icon 336 and clicked. As a result, the aircraft icon may have changed color from a blue icon indicating the aircraft is scheduled to land at JFK International to a red icon indicating that the user has selected this flight track to obtain additional information about the aircraft's flight path. Simultaneously with this selection, the additional information for this flight path 336 appeared in the flight information box 306. This additional information included the type of aircraft ("J328" referring to a Fairchild Dornier 328 jet) and the current altitude ("700 ft") for this aircraft. This information may also be included in the target data points provided by the data feed arrangement 100 to the FTDS system server 120 for each aircraft being tracked. Thus, the user has obtained additional information about the flight track of interest by simply clicking on the aircraft icon.

As shown in flight information box 306, there may be additional information that can be displayed for the flight track. However, this information may not be displayed at this time for a variety of reasons. For example, because of security concerns the airport/airline may not desire to display the flight identification information or the origin/destination information on the near real time display. Another example may be that some information is not yet available. For example, as described above, the data feed arrangement 100 may actually be a series of independent data feed arrangements which contribute different data to the FTDS system server 120. These independent data feed arrangements may send this data at different times and different data refresh rates. Thus, the FTDS system server 120 needs to correlate this varying data to the correct target flight record and compare the data from the varying data feed arrangements to insure the accuracy of the information. In such cases, not all the information may be correlated and verified to be displayed on the near real time display.

Figure 5:
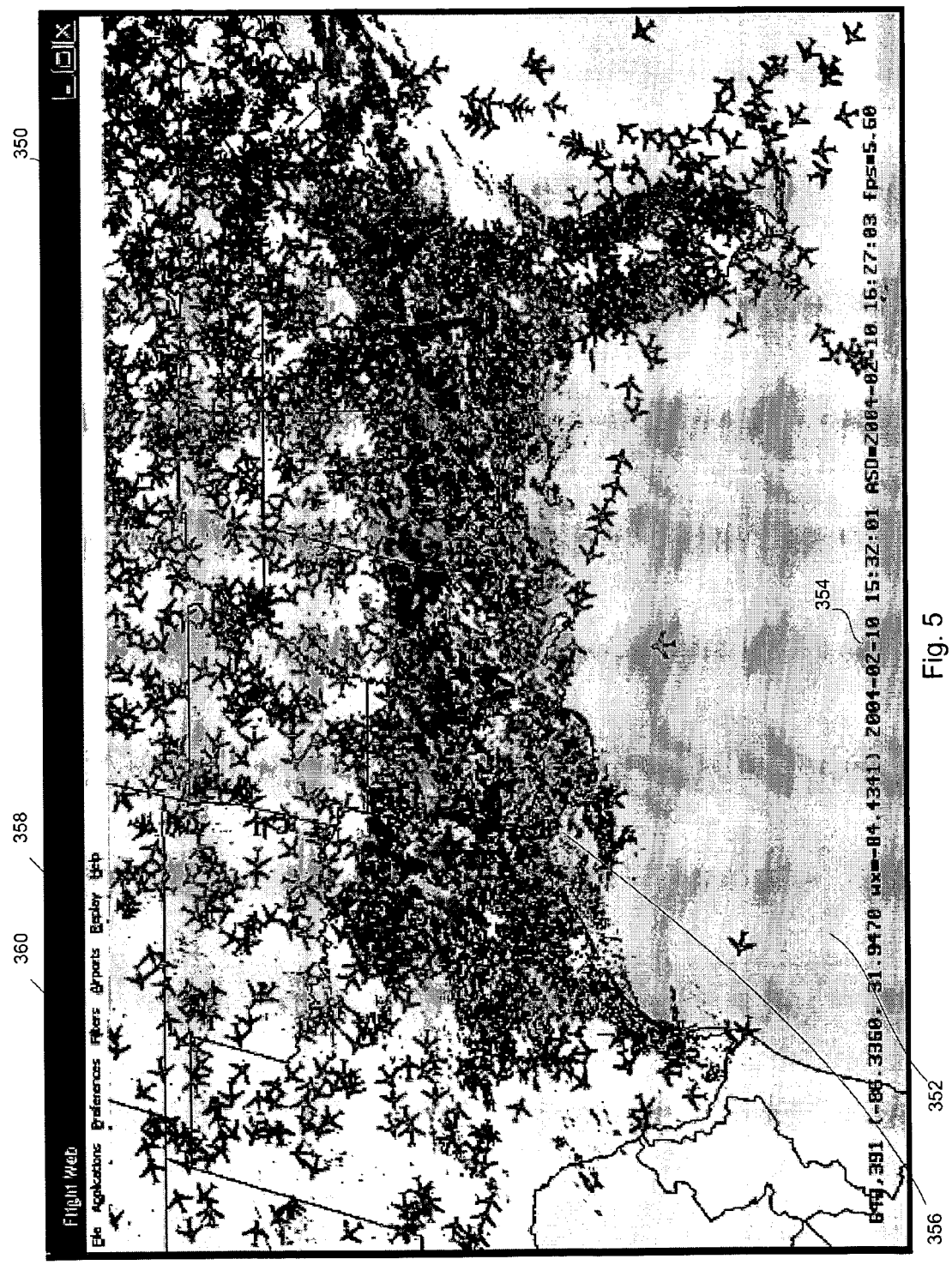
FIG. 5 shows an exemplary display screen that may be generated by the FTDS system server and transmitted to the users via the web server software according to the present invention.

FIG. 5 shows another exemplary display screen 350 that may be generated by the FTDS system server 120 and transmitted to the users 200-202 via the web server software 130. The display screen 350 includes a map portion 352, here displaying an expanded view of the South East Region of the United States. There are numerous aircraft icons representing aircraft operating in the South East Region of the United States. In this exemplary display, the map range field 304, the flight information box 306, the legend box 308 and the replay field 310 of the previous figure have been hidden by the user to allow for a larger viewing area. The user may select to have the flight information alternatively displayed in a flight information overlay 354, shown on the bottom of the map portion 352. Similarly, the user may also select to display a replay pull-down menu 358 rather than the replay field 310. At any given time, the users 200-202 may choose whether or not to display such information and the particular format that should be displayed.

Figure 6:
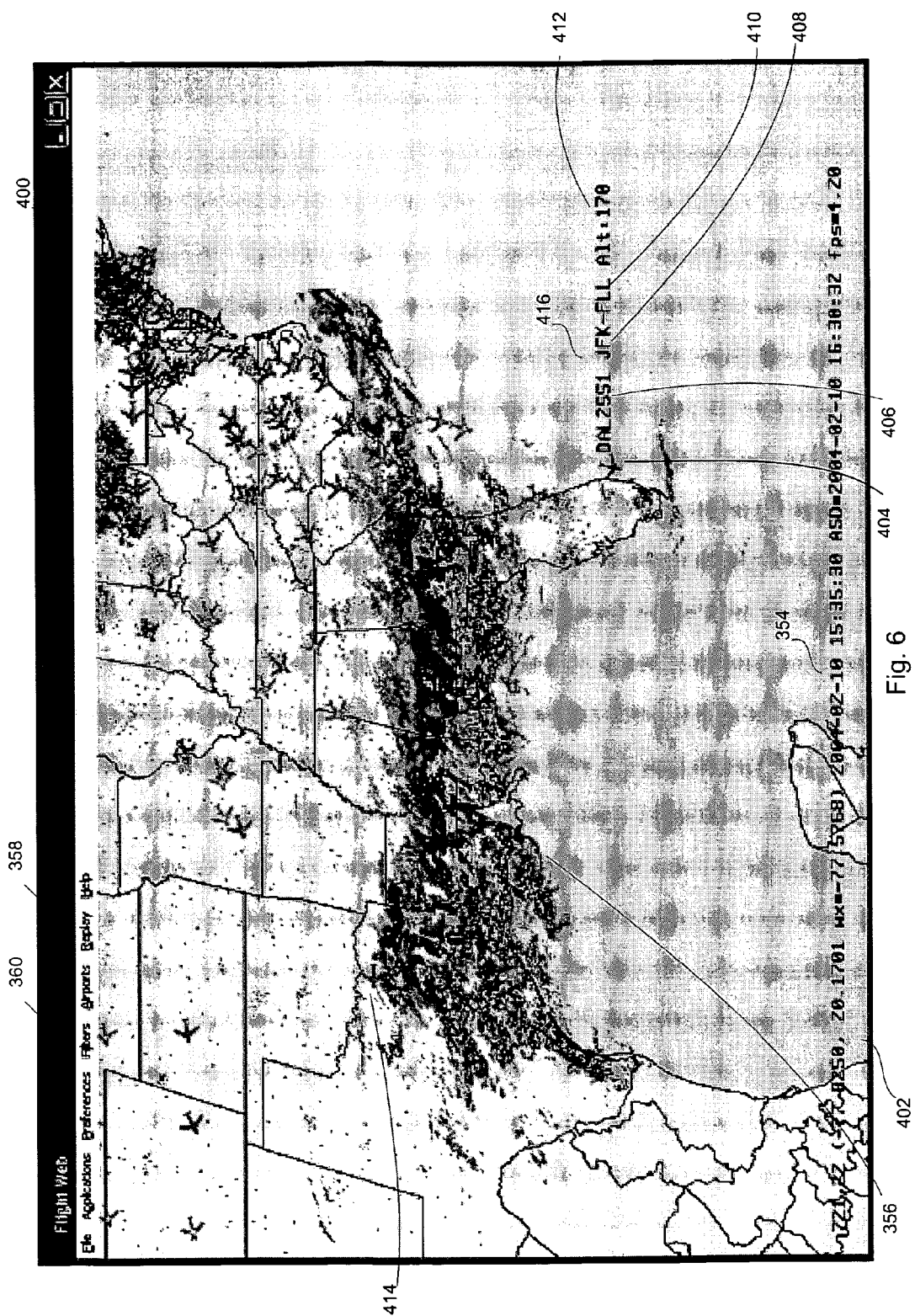
FIG. 6 shows an exemplary display screen that may be generated by the FTDS system server and transmitted to the users via the web server software according to the present invention.

FIG. 6 shows another exemplary display screen 400 that may be generated by the FTDS system server 120 and transmitted to users 200-202 via the web server software 130. The display screen 400 includes a map portion 402, here again displaying an expanded view of the South East Region of the United States. As discussed above, a user may choose to hide the map range field 304, the flight information box 306, the legend box 308 and the replay field 310 to allow for a larger viewing area. The user in this exemplary embodiment has chosen to display a flight information overlay 354, shown on the bottom of the map portion 402. The flight information overlay 354 tells the user here that the information shown is from the time 16:30:32 on Feb. 10, 2004 (displayed as "2004-02-10") and that ASD data is being received. As compared to the display screen 350 of FIG. 5, the number of aircraft icons displayed on display screen 400 is significantly less. The number of flight tracks to be displayed may depend on the zoom level and the appearance on the screen or the particular filter applied by the user. In some cases, as in FIG. 5, the display screen may appear too cluttered in high traffic local areas or in an expanded region. In such cases, filters may be used to reduce screen clutter. For example, a filter may be used to select only the flights associated with a particular airline or the "n" closest flights to these selected flights. A filter may be selected by the user via a filter pull-down menu 360. Those of skill in the art will understand that there may be any number of filters that may be used to reduce the number of tracks shown an any particular display screen. By selecting these filters, a user (e.g., users 200-202) may obtain the desired picture for presentation.

The map portion 402 of FIG. 6 shows several aircraft icons including an aircraft 404 flying along the South East coast of Florida and an aircraft 414 flying in the North East corner of Texas. Depending on the proximity of the PSSR to either aircraft 404 or 414, the flight tracks may be generated using PSSR, ASD, or a combination of data from both data sources received in the data feed arrangement 100. In this embodiment, the use has selected to hide the flight information box 306 and to display a flight track data overlay 416 and the flight information overlay 354. In this exemplary embodiment, the data displayed for selected aircraft 404 in the flight data overlay 416 includes a flight number 406, departed airport 408, destination airport 410, and altitude 412. For example, the aircraft 404 represents a Delta Airlines flight 2551, having departed from JFK International and heading for Fort Lauderdale Airport at an altitude of 17,000 feet. The color of the aircraft 404 as displayed may further tell the user that aircraft 404 is preparing to land.

Figure 7:
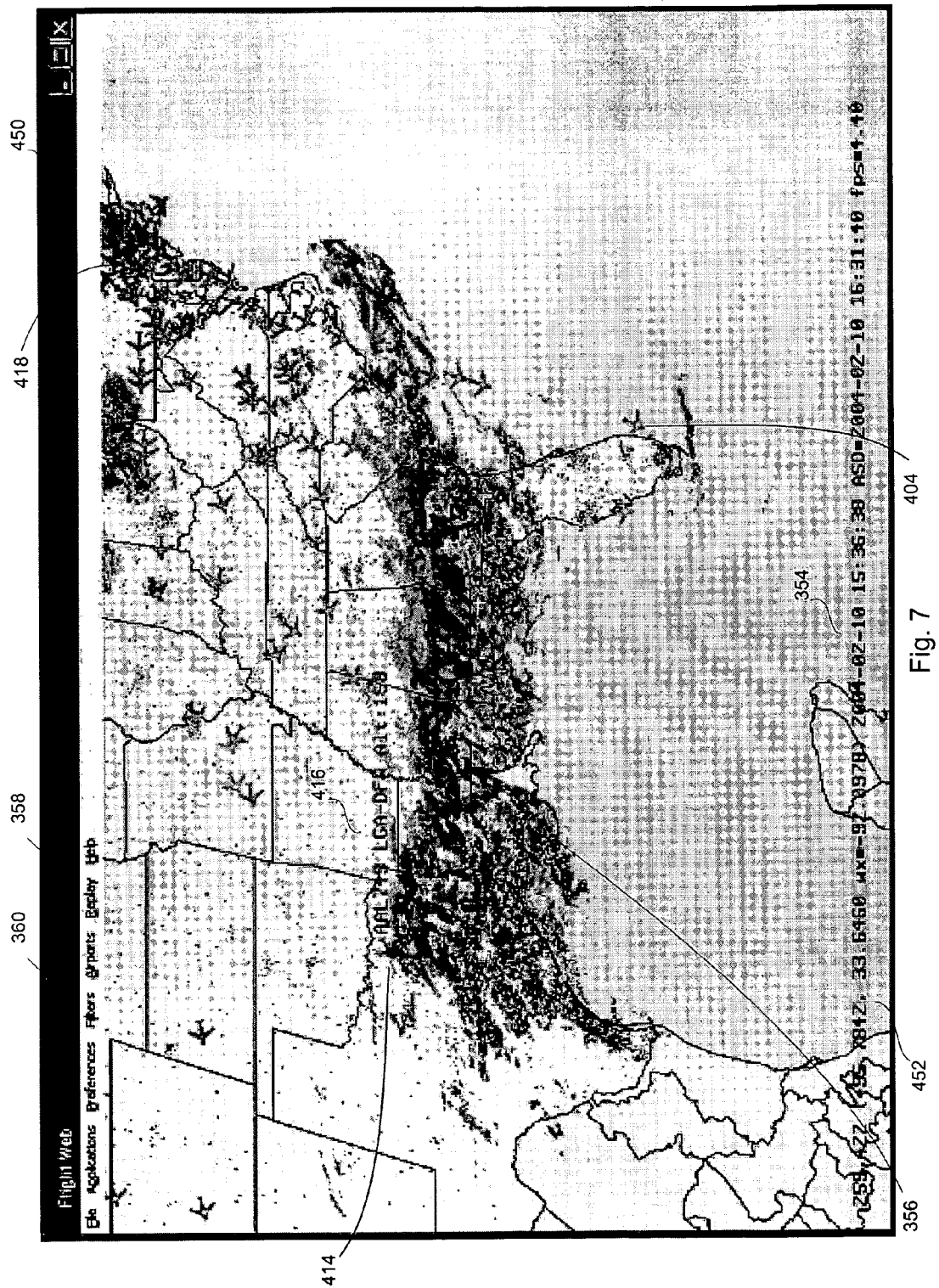
FIG. 7 shows an exemplary display screen that may be generated by the FTDS system server and transmitted to the users via the web server software according to the present invention.

FIG. 7 shows the South East region of the United States at time sixty-eight seconds after that of FIG. 6. The display screen 450 includes a map portion 452, here again displaying an expanded view of the South East Region of the United States. The flight information overlay 354 tells the user that the information shown is from the time 16:31:40 on Feb. 10, 2004 and ASD data is being received by the data feed arrangement 100. A comparison of the displays 400 and 450 will show that the aircraft icons 404 and 414 have moved their relative locations in the sixty-eight seconds which has elapsed between the displays. It should be understood that the sixty-eight seconds between the displays 400 and 450 is only exemplary and that an actual user logged into the exemplary FTDS system 1 may see multiple screen updates in this sixty-eight second period (e.g., every 4.6 seconds when the data feed arrangement 100 is the PASSUR™ System). In this exemplary embodiment, the user has selected aircraft 414 and the flight track data overlay 416 is displaying the known information for the selected aircraft. In this embodiment, aircraft 414 is shown to represent an American Airline flight 743, having departed from LaGuardia Airport and heading for Dallas Fort Worth Airport at an altitude of 15,800 feet.

FIG. 5-7 show how the present invention may allow the developer or user to control the appearance of the display. This feature is for access of the developer to the information contained on the FTDS server 110 so the developer may change the features and functionality of the FTDS system 1. For example, the control may allow the developer to control the number of tracks to be displayed, the area of the display coverage and the selection of the appropriate background map. This feature may allow the user to apply certain overlays on the map such as a weather overlay 356 from the National Weather Service. This feature may also allow the user or developers to apply other overlays on the map such as the street address or location of the user.

The present invention allows users to replay flight activity from a prior data and time. The replay field 310 and the replay pull-down menu 358 allow a user to select a past date and time to begin playback of the flight tracks from that time. In response to this request from the user, the FTDS system server 120 will retrieve the saved target flight records which include this date/time information and begin the replay of the flight tracks starting with the time entered by the user. The FTDS system server 120 retrieved the applicable target flight records and used the data to generate the flight tracks. The method of generating the flight tracks is the same as that with the real time data except that the FTDS system server 120 is not using the information currently being received from the data feed arrangement 100. Rather, the data is from archived target flight records which correspond to the time entered by the user.

The only limitation on the replay feature may be the amount of data which can be stored in the FTDS server 110. As long as the FTDS system server 120 can access the appropriate target flight records, the FTDS system server 120 can generate the flight tracks using the archived data. In addition, the FTDS system server 120 may generate the replay flight tracks in a fast forward manner. For example, the flight tracks may be displayed in 5 times (5×) speed or any other speed selected by the user. Since the data is archived data, the FTDS system server 120 does not need to wait for the data feed arrangement to send new target data points for the flight tracks, it merely needs to generate the flight tracks from the archived target flight records.

It should be understood that a user may use the current displays and the replays displays to gain a complete understanding about the flight track of a particular aircraft. For example, the user may hear or see an airplane fly over his house at a particular time. The user may then use the near real time display to determine certain information about the flight as shown on display 330 of FIG. 4. The user may then go back and use the replay function at a later time to display the same flight track to obtain the complete information for the flight. Since the user may enter the time for the replay and since the initial information provides a time/date and a track ID, the user may easily verify that he is obtaining information on the same flight.

Another feature which may be implemented in the FTDS system 1 is a find flight function. In this case the user may enter information about a particular flight and the FTDS system 1 would find the flight and display the flight track for that aircraft. The aircraft may be found at any location from which the data feed arrangement is receiving PSSR or ASD data.

The FTDS system 1 enables the users 200-202 to become informed about the airspace surrounding their neighborhood and noise events resulting from aircraft. This information may lead to a reduction in call volume to the noise office of the local airport and a reduction in the costs associated with that office. Similarly, the noise office may be able to respond in a faster manner to complaints and other requests because the user will be informed and have the complete information about a particular flight.

As described above, the flight tracks may also be for other aircraft beside planes such as helicopters. The determination of whether a particular target aircraft is a helicopter as opposed to a plane may be determined by the performance of the aircraft. For example, the altitude, speed, flight pattern and beacon code may be used to distinguish a helicopter.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system for displaying flight track data, comprising:
a data feed arrangement to receive a first target data point from a first data source, the first target data point having a first set of characteristics;
a data receiving arrangement comparing the first target data point to a second target data point from a second data source having a second set of characteristics, wherein:
when a characteristic of the first set matches a characteristic of the second set, the data receiving arrangement correlates the first and second target data points and merges the first and second target data points into correlated target data points and,
when no characteristic of the first set matches a characteristic of the second set, the data receiving arrangement maintains the first and second target data points as separate target data points;
a data analyzing arrangement to analyze the separate target data points from the first and second data sources and the correlated target data points, wherein the data analyzing arrangement stores the separate target data points and the correlated target data points corresponding to a target aircraft in a target flight record for the target aircraft;
a data generation arrangement to generate a flight track for the target aircraft using the data stored in the target flight record, wherein the flight track includes a first portion generated from the first data source and a second portion generated from the correlated target data points; and
a data distribution arrangement to organize the flight track into a displayable file and distribute the file to users of the system, wherein the displayable file is displayed on a graphical user interface including the flight track information.

2. The system of claim 1, wherein the first data source is one of a PSSR radar system and an ASD system, and the second data source is the other one of the PSSR radar system and an ASD system.

3. The system of claim 1, wherein the first and second sets of characteristics of the target data points include location and time information which is displayed by the graphical user interface.

4. The system of claim 1, wherein the displayable file is distributed via a network.

5. The system of claim 4, wherein the network is the Internet.

6. The system of claim 1, wherein the graphical user interface is a personal computer.

7. The system of claim 1, wherein the first and second sets of characteristics of the target data points include flight position, time, velocity, and altitude.

8. The system of claim 7, wherein the flight information further includes a flight number, an origin, and a destination.

9. The system of claim 7, wherein the data distribution arrangement further organizes the flight information into the displayable file.

10. The system of claim 1, wherein the aircraft is a helicopter.

11. The system of claim 1, wherein the displayable file further includes a map portion.

12. The system of claim 11, wherein the map portion includes aircraft icons, wherein aircraft icons corresponding to landing aircraft include a first color, aircraft icon corresponding to departing aircraft include a second color, and aircraft icons corresponding to transitioning aircraft include a third color.

13. The system of claim 12, wherein the aircraft icons further include a tail.

14. The system of claim 12, further comprising:
a flight information function to display information of a selected aircraft icon on the map portion.

15. The system of claim 1, further comprising:
a replay function to distribute the displayable file to users of the system correspond to an entered time.

16. The system of claim 1, further comprising:
a find flight function to distribute the displayable file to users of the system corresponding to entered data.

17. A method, comprising the steps of:
collecting a first target data point from a first source corresponding to data for a target aircraft, the first target data point having a first set of characteristics;
comparing the first target data point to a second target data point from a second data source having a second set of characteristics;
when a characteristic of the first set matches a characteristic of the second set, correlating the first and second target data points and merging the first and second target data points into correlated target data points;
when no characteristic of the first set matches a characteristic of the second set, maintaining the first and second target data points as separate target data points;
storing each of the separate target data points and correlated target data points corresponding to a target aircraft in a target flight record;
creating a flight track from the target flight record, wherein a first portion of the flight track is generated with data from the first data source and a second portion of the flight track is generated with data from the first data source and the second data source; and
creating a displayable file including the flight track and additional information, wherein the displayable file is displayable on a graphical user interface.

* * * * *